United States Patent [19]

Takahashi et al.

[11] Patent Number: 4,816,993
[45] Date of Patent: Mar. 28, 1989

[54] PARALLEL PROCESSING COMPUTER INCLUDING INTERCONNECTED OPERATION UNITS

[75] Inventors: Fumio Takahashi, Hitachi; Yukio Nagaoka, Toukai; Iwao Harada, Mito, all of Japan

[73] Assignee: Hitachi, Ltd., Tokyo, Japan

[21] Appl. No.: 810,278

[22] Filed: Dec. 18, 1985

[30] Foreign Application Priority Data

Dec. 24, 1984 [JP] Japan .............................. 59-270898
Dec. 26, 1984 [JP] Japan .............................. 59-273061

[51] Int. Cl.[4] .................... G06F 15/16; G06F 15/31
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 4,195,351 | 3/1980 | Barner et al. | 364/900 |
| 4,467,422 | 8/1984 | Hunt | 364/200 |
| 4,514,807 | 4/1985 | Nagi | 364/200 |
| 4,608,629 | 8/1986 | Nagel | 364/200 |
| 4,663,706 | 5/1987 | Allen et al. | 364/200 |

OTHER PUBLICATIONS

Cyre et al., "WISPAC: A Parallel Array Computer for Large-Scale System Simulation", Simulation, Nov. 1977, pp. 165-172.

Primary Examiner—Thomas M. Heckler
Assistant Examiner—Rebecca L. Adams
Attorney, Agent, or Firm—Antonelli, Terry & Wands

[57] ABSTRACT

A plurality of operation units are connected to one another. The operation units include a processor, a buffer memory, and a data transfer control circuit connected between the processor and the buffer memory for controlling the data input-output with the buffer memories in the other of the operation units. The buffer memories and the data transfer control circuit are connected with one another by data buses, respectively.

12 Claims, 15 Drawing Sheets

| OPERATION UNIT | | P1 | | P2 | | P3 | | P4 | |
|---|---|---|---|---|---|---|---|---|---|
| DATA ARRANGEMENT | | n ---- 2 | 1 | n ---- 2 | 1 | n ---- 2 | 1 | n ---- 2 | 1 |
| (1) | CONTENT OF MEMORY | | A | | B | | C | | D |
| | COUNT VALUE OF COUNTER | 2 | | 2 | | 2 | | 2 | |
| (2) | CONTENT OF MEMORY | | D | | A | | B | | C |
| | COUNT VALUE OF COUNTER | 1 | | 1 | | 1 | | 1 | |
| (3) | CONTENT OF MEMORY | | C | | D | | A | | B |
| | COUNT VALUE OF COUNTER | 0 | | 0 | | 0 | | 0 | |

FIG. 10

| | OPERATION UNIT | P1 | | | P2 | | | P3 | | | P4 | | |
|---|---|---|---|---|---|---|---|---|---|---|---|---|---|
| | DATA ARRANGEMENT | n | ---2 | 1 | n | ---2 | 1 | n | ---2 | 1 | n | ---2 | 1 |
| (1) | CONTENT OF MEMORY | | | A | | | B | | | C | | | |
| | COUNT VALUE OF COUNTER | 1 | | | 2 | | | 3 | | | 0 | | |
| (2) | CONTENT OF MEMORY | | | | | | A | | | B | | | C |
| | COUNT VALUE OF COUNTER | 0 | | | 1 | | | 2 | | | 0 | | |
| (3) | CONTENT OF MEMORY | | | | | | | | | A | | B | C |
| | COUNT VALUE OF COUNTER | 0 | | | 0 | | | 1 | | | 0 | | |
| (4) | CONTENT OF MEMORY | | | | | | | | | | A | B | C |
| | COUNT VALUE OF COUNTER | 0 | | | 0 | | | 0 | | | 0 | | |

| BUS CONNECTION CONTROL SIGNAL | | | | ARRANGEMENT OF OPERATION UNIT |
|---|---|---|---|---|
| | bc1 | bc2 | bc3 | |
| a | 0 | 0 | 0 |  4-ROW 4-COLUMN (BASIC ARRANGEMENT) |
| b | 0 | 0 | 1 |  |
| c | 0 | 1 | 0 |  |
| d | 0 | 1 | 1 |  |
| e | 1 | 0 | 0 |  |
| f | 1 | 0 | 1 |  |
| g | 1 | 1 | 0 |  |
| h | 1 | 1 | 1 |  |

4,816,993

PARALLEL PROCESSING COMPUTER INCLUDING INTERCONNECTED OPERATION UNITS

BACKGROUND OF THE INVENTION

This invention relates to a parallel processing computer, and more particularly to a multiple instruction flow, multiple data flow type (MIMD flow) type parallel processing computer which is suitable for obtaining a numeric solution of a partial differential equation by parallel processing at a high speed.

Parallel processing computers executing parallel processing by use of a plurality of processors have been developed in the past in order to make calculations of scientific technology, particularly to obtain numeric solutions of partial differential equations. A typical example of such computers is disclosed in the article entitled "PACS" A Parallel Microprocessor Array for Scientific Calculations" in ACM Transactions on Computer Systems, Vol. 1, No. 3, August 1983, pp. 195–221.

This computer is referred to as an "adjacent connection type" in which adjacent processors are connected to constitute an array processor of a unidimensional or two-dimensional arrangement. Although the computer had the advantage that the connection between the processors can be made easily, it involves the drawback that the data transfer time between remote processors is great.

That is, data transfer between the remote processors can be made through relay processors, but the relay processors need time to receive and send the data. Therefore, the ratio of the transfer time to the data processing time is great and the processing performance is not sufficiently high.

Since the hardware arrangement of the processors is fixed, the efficiency of calculation depends upon the problem to be solved, as will be illustrated below.

(1) When a unidimensional problem (e.g., $$\frac{\partial \phi}{\partial t} = \frac{\partial^2 \phi}{\partial x^2}$$

is processed by the processors in a two-dimensional arrangement, only the processors of one row or one column are used as shown in FIG. 2(a), but the assignment of calculation lattice points such as shown in FIG. 2(b) is made generally. In the former case, the number of lattice points assigned to one processor is great so that calculation time is long. In the latter case, the data transfer direction differs with the position of the processor, so that an excessive processing time is necessary for this judgement.

(2) When a two-dimensional calculation (e.g., a solution method with an explicit difference $$\frac{\partial \phi}{\partial t} = \frac{\partial^2 \phi}{\partial x^2} + \frac{\partial^2 \phi}{\partial y^2} )$$

is made, the number of transfer data is greater in the processors having a unidimensional arrangement than in processors with a two-dimensional arrangement, and the processing time is longer. For example, when a calculation of 16×16 lattice points is made by 16 processors in a unidimensional arrangement and by 4×4 processors in a two-dimensional arrangement, the number of transfer data between the adjacent processors is 16 for the two-dimensional arrangement whereas it is 32 in the unidimensional arrangement, although 16 lattice points are to be assigned to each processor in either case.

As described above, the number of transfer data is likely to increase and the processing load for one processor becomes great, depending upon the arrangement of the processors even when the same problem is to be solved, and if the arrangement of the processors is fixed, the efficiency of calculation is reduced for such a problem.

SUMMARY OF THE INVENTION

An object of the present invention is to provide a parallel processing computer which can simultaneously start data transfer between the processors, and can speed up the data transfer between the remote processors.

Another object of the present invention is to provide a parallel processing computer which can form an optimal processor arrangement in accordance with a problem to be solved, in order to execute highly efficient parallel calculation processing.

In the prior art example described above, the data transfer between the remote processors is made by means of the input-output instruction of relay processors, therefore, the execution time of the input-output instruction is great. Furthermore, since the same memory is used as a buffer memory for the input-output ports, it is necessary to effect control so that adjacent processors do not attempt to simultaneously access the buffer memory.

The present invention is based upon the concept that if a First-In First-Out type of memory having separate input and output ports is used as a buffer memory for each processor and these buffer memories are connected to constitute a data transfer bus, each processor can simultaneously store the data in the buffer memory of the data transfer bus. If data in a quantity corresponding to the data transfer destination are transferred between the buffer memories, data transfer between remote processors can be made without using the input-output instruction of relay processors. The present invention is completed on the basis of the concept described above.

In the processors that are arranged two-dimensionally, furthermore, the present invention provides the function of unidimensionally connecting the processors of different rows or columns, and changes the arrangement of the processors in order to minimize data transfer between the processors in accordance with the lattice arrangement of the problem to be solved.

In accordance with the present invention, the data transfer between the processors can be made by controlling the data quantity input and output to and from the buffer memories without using the input-output instructions of the processors. Therefore, the speed of data transfer between remote processors can be significantly increased.

BRIEF DESCRIPTION OF THE DRAWINGS

FIG. 8 is a timing chart of the output signal generation circuit 51 of FIG. 7;

FIGS. 9 and 10 are tables showing the change of the contents of buffer memories at the time of data transfer;

Hereinafter, one embodiment of the present invention will be described with reference to the accompanying drawings.

Figure 1:
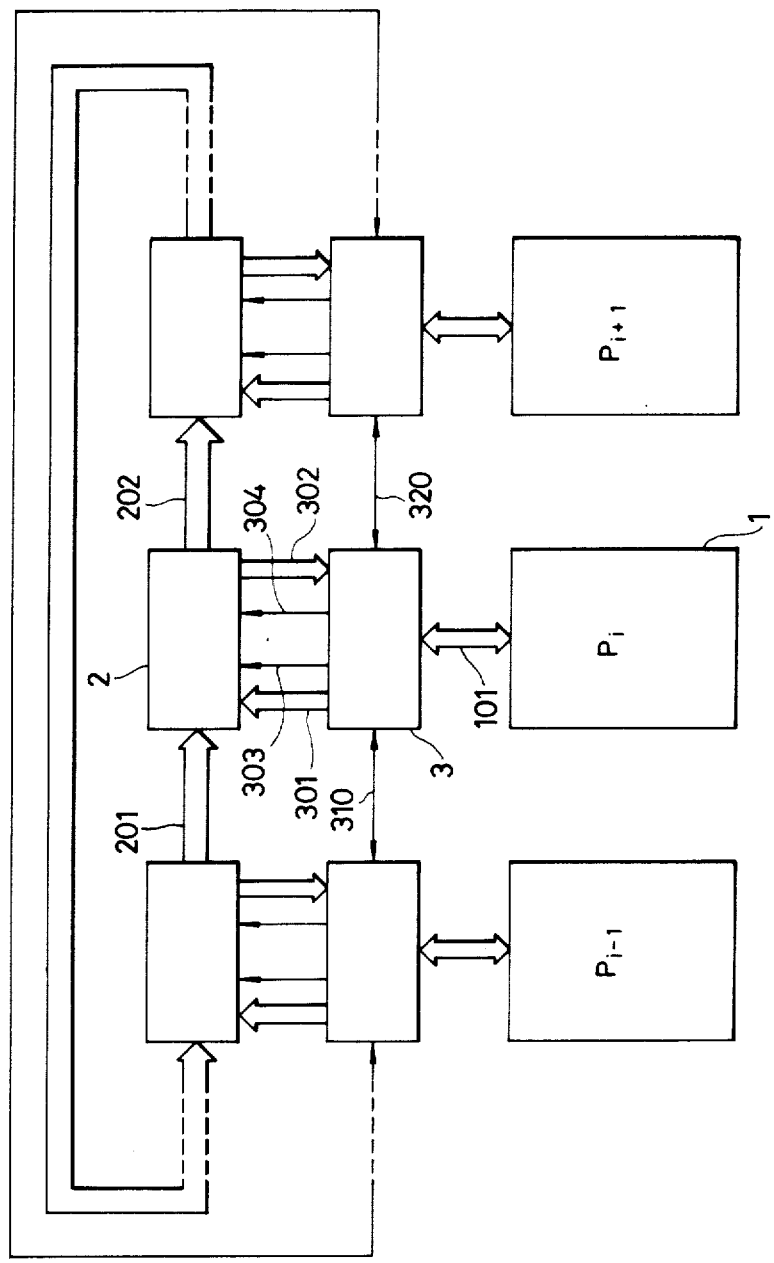
FIG. 1 is a structural view of a parallel processing computer which is arranged uni-dimensionally in accordance with the present invention.

FIG. 1 is a schematic view representing the construction of a parallel processing computer in accordance with the present invention, and shows an example in which a plurality of operation units are disposed unidimensionally. In FIG. 1, reference numeral 1 represents a processor, 2 is a First-In First-Out type buffer memory and 3 is a data transfer control circuit. The processor 1 and the data transfer control circuit 3 are connected by a bi-directional address line 101, while the data transfer control circuit 3 and the input and output terminals of the buffer memory 2 are connected by unidirectional data signal lines 301, 302 and control signal lines 303, 304, respectively, thereby constituting one operation unit.

The operation unit $P_i$ is connected to adjacent operation units $P_{i-1}$ and $P_{i+1}$. In other words, the data input terminal of the buffer memory 2 of the operation unit $P_i$ and the data output terminal of the buffer memory of the operation unit $P_{i-1}$, and the data output terminal of the buffer memory of the operation unit $P_i$ and the data input terminal of the buffer memory of the operation unit $P_{i+1}$ are connected by the unidirectional data lines 201 and 202, respectively, while the data transfer control circuit of the operation unit $P_i$ and the data transfer control circuit 2 of the operation unit $P_{i-1}$, and the data transfer control circuit 2 of the operation unit $P_i$ and the data transfer control circuit 2 of the operation unit $P_{i+1}$ are connected by the bi-directional control lines 310 and 320, respectively, thereby constituting a data transfer bus.

Figure 2:
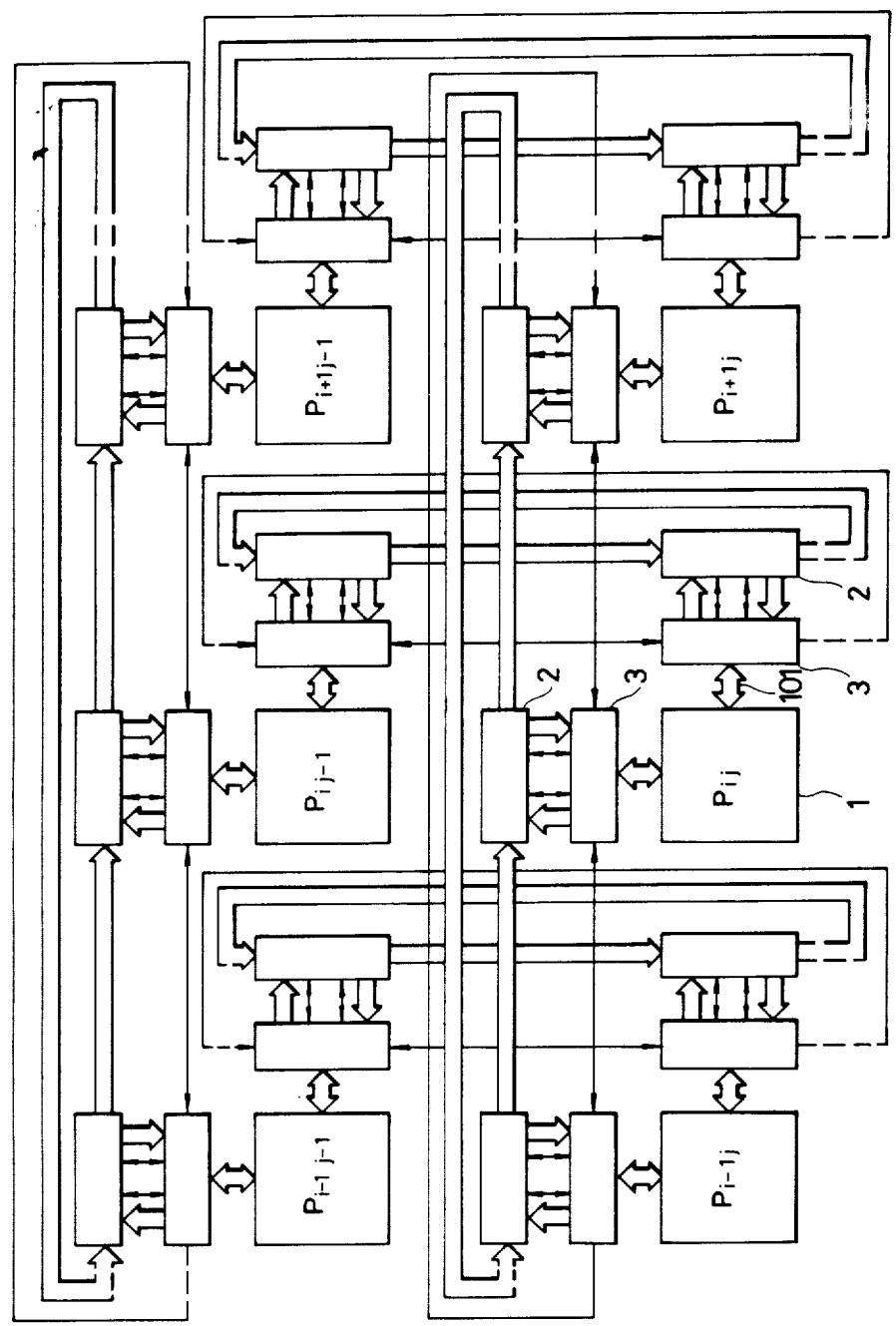
FIG. 2 is a structural view of a parallel processing computer which is arranged two-dimensionally in accordance with the present invention.

FIG. 2 shows an embodiment of a parallel processing computer constituted by disposing M×N operation units on a two-dimensional lattice. Buffer memories 2 and data transfer control circuits 3 are disposed in both directions of row and column for each processor 1, and are connected in the same way as the embodiment of the unidimensional arrangement in order to constitute each operation unit. The buffer memories 2 and the data transfer control circuits 3 are connected in each of the row and column directions to constitute mutually independent M data transfer buses in the row direction and N buses in the column direction.

Data transfer in the row or column direction is effected without passing through the processor 1, and data transfer between the processors 1 whose row and column are different is effected by two processors on the reception side and the transmission side, or through the processors having row or column which is coincident.

In the embodiment in which the operation units are arranged two-dimensionally, the construction for each row and for each column is the same as in the unidimensional arrangement. Therefore, the following description will be based upon the embodiment of the unidimensional arrangement.

Figure 3:
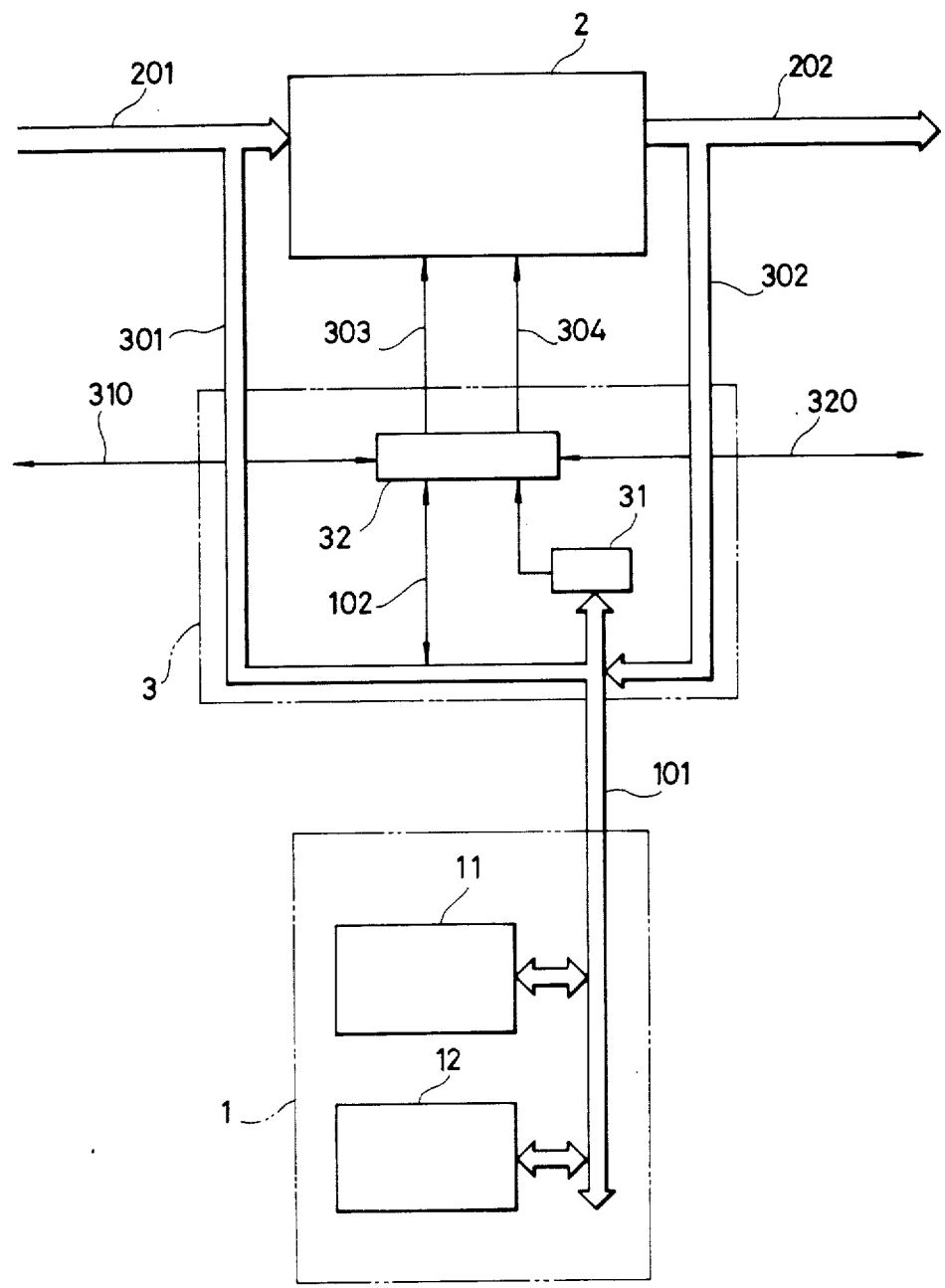
FIG. 3 is a structural view of the operation unit of FIG. 1.

FIG. 3 is a schematic view showing the construction inside the operation unit. The processor 1 consists of an operation device 11 and a memory 12, and the data transfer control circuit 3 consists of a counter circuit 31 and an input-output signal generation circuit 32. Instruction code and numeric value data of the operation device 11 are stored in the memory 12 of the processor 1, and the operation is made asynchronously in each processor. The data transfer control circuit 3 is a circuit which controls the data input and output between the processor 1 and the buffer memory 2, the data output from the buffer memory 2 to the unidirectional data line 202 and the data input from the unidirectional data line 201 to the buffer memory 2. The data output from the buffer memory 2 to the unidirectional data line 202 is effected when the processor 1 sets the number of signals produced from the input-output signal generation circuit 32 to the output control signal line 304 and produces a signal to the output control signal line 304.

The data input from the unidirectional data line 201 to the buffer memory 2 is effected by a signal which is produced from the input-output signal generation circuit 32 to the input control signal line 303 in synchronism with a signal representing that the adjacent operation unit which sends a signal through the control signal line 310, produces the data to the unidirectional data line 201.

Figure 4:
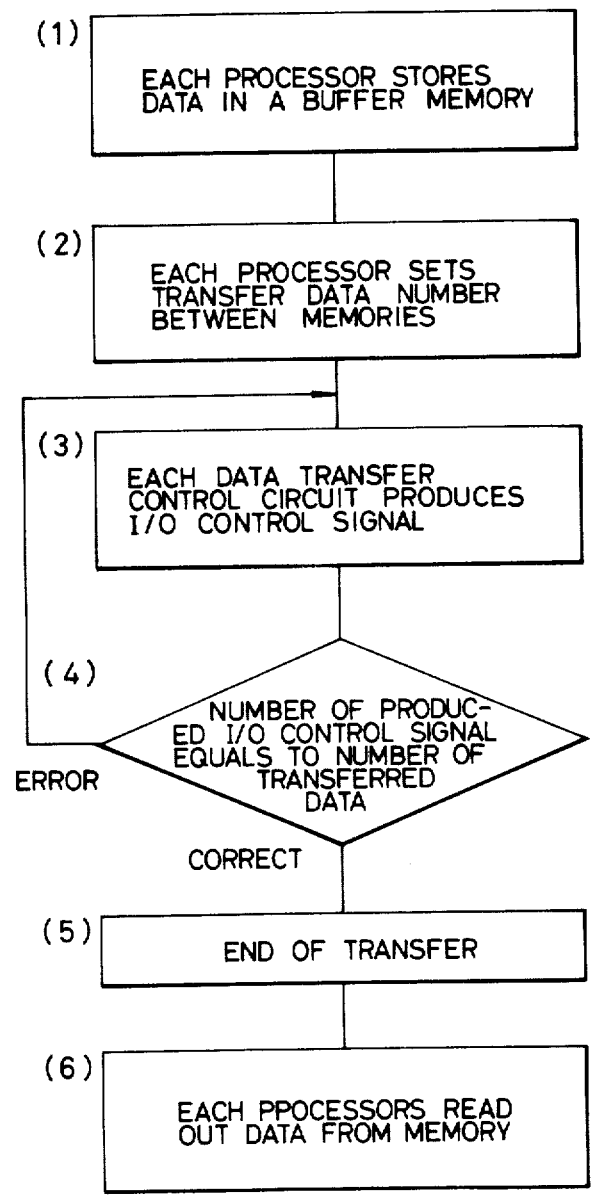
FIG. 4 is a flowchart showing the transfer operation between the operation units of FIG. 1.

Hereinafter, the flow of data transfer between the processors will be described. FIG. 4 is a flow-chart of the data transfer between the processors.

(1) Each processor 1 stores the data to be transferred to the other processors in the buffer memory 2 through the input data signal line 301 irrespective of the operation of the other processors.

(2) Each processor 1 sets the transfer data number between the operation units as a count value of the counter of the data transfer control circuit 3.

(3) Each data transfer control circuit 3 produces an input control signal and an output control signal to the buffer memory 2 through the input control signal line 303 and the output control signal line 304, whereby the data input and output of the buffer memory 2 is effected so that, data transfer is effected between the buffer memories. Since a First-In First-Out type of memory is used as the buffer memory, the data is produced in accordance with the input sequence of the data. To insure the sequence of data on the data transfer bus, a data transfer flag indicates when all the processors have finished storing the data in their buffer memories, and the data transfer is started.

(4) The number of data elements transferred between the buffer memories is counted, and the value of the counter of the data transfer control circuit 3 is decremented.

(5) When the value of the counter is zero, generation of the output control signal is stopped, and the data transfer flag is reset.

(6) After confirming that in each processor 1 and the data transfer flag has been reset, the data is read out from the buffer memory 2.

Next, the operation of the data transfer control circuit as the principal portion of the parallel processing computer in accordance with the present invention will be described in detail with reference to FIGS. 5 to 8.

Figure 5:
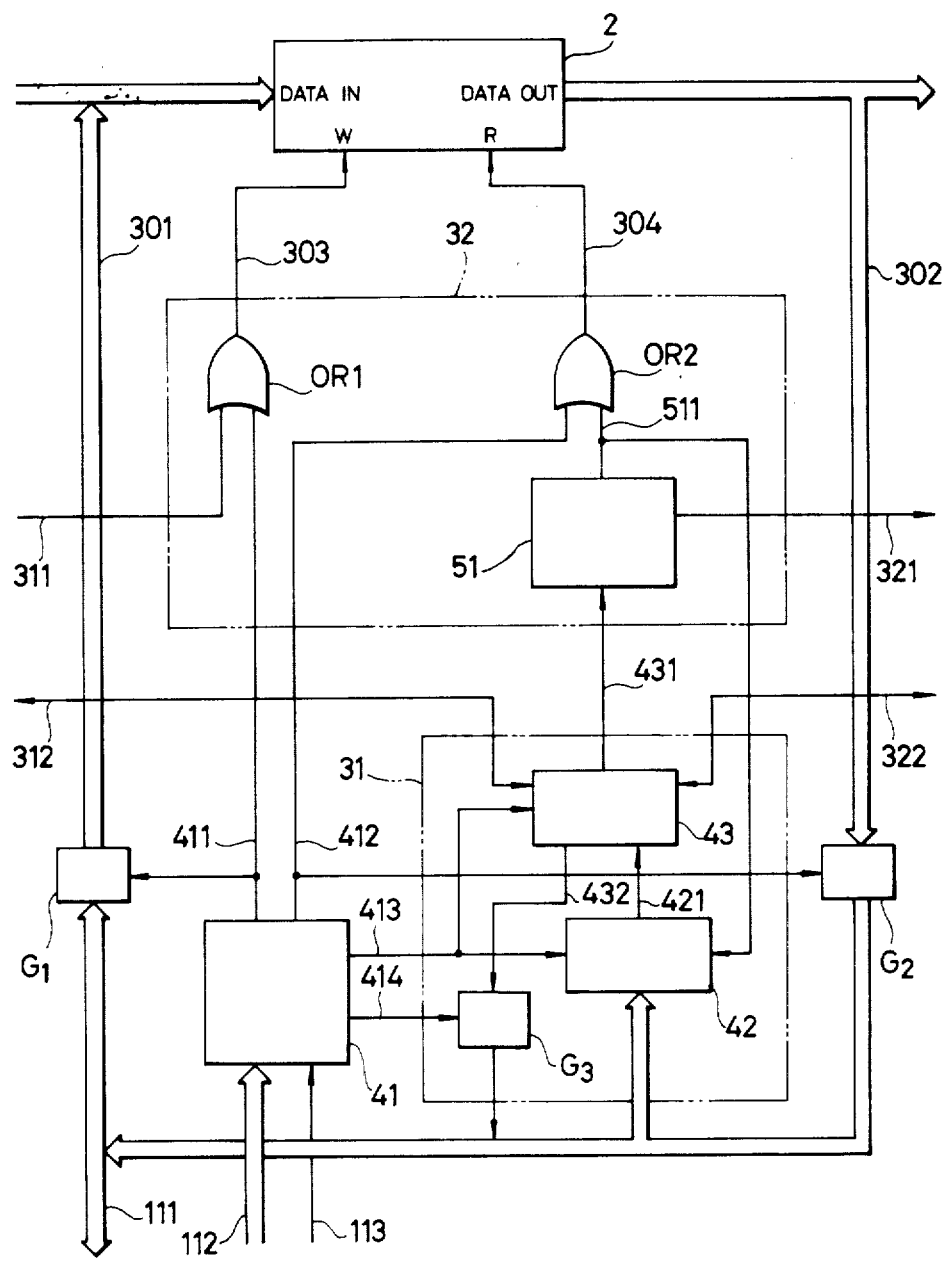
FIG. 5 is a structural view of the data transfer control circuit 3 of FIG. 3.

FIG. 5 is a structural view showing the construction of the data transfer control circuit. In FIG. 5, reference numeral 41 represents a decoder circuit; 42 is a counter; 43 is a synchronization circuit; 51 is an output signal generation circuit; G1 through G3 are gate circuits; and OR1 and OR2 are OR elements.

The bidirectional data address signal line 101 from the processor consists of a data signal line 111, an address signal line 112 and a control signal line 113. An address corresponding to one word is assigned to each buffer memory, counter and synchronization circuit, and the data input and output to the buffer memory by the processor is effected by executing a data write or read instruction to and from the address of the buffer memory. In other words, when the decoder circuit 41 judges that the address signal 112 is the address of the buffer memory and the control signal 113 is a write signal (e.g., a logic "0"), for example, the input control signal 411 is generated. When the control signal 113 is a read signal (e.g., a logic "1"), for example, the output control signal 412 is generated. These signals are then applied to the write (W) or read (R) control terminal of the buffer memory through the OR element OR1 or OR2. At this time, the input and output control signals 411 and 412 open the gate circuits G1 and G2, and the input data line 301 or the output data line 302 of the buffer memory is connected to the data line 111 on the side of the processor.

Next, data transfer control between the buffer memories of the adjacent operation units will be described. The data transfer between the buffer memories is started by delivering the transfer word number to the data transfer control circuit 3. In other words, the processor executes the write instruction of the transfer word number for the address which is alloted to the counter 42. The decoder circuit 41 generates a counter set signal 413 and sets the signal of the data line 111, that is, the transfer word number, as the count value of the counter 42.

The counter set signal 413 is also applied to the synchronization circuit 43. The synchronization circuit 43 sets the data transfer flag 432, and delivers a transfer instruction signal 431 to the output signal generation circuit 51 when the transfer flags 312 and 322 of all the operation units are set.

The output signal generation circuit 51 periodically delivers the buffer memory output control signal 511 while the transfer instruction signal 431 is at logic "1", and also sends the input control signal 321 to the adjacent (on the down-stream side with respect to the data flow) buffer memories. The buffer memory output control signal 511 is also applied to the counter 42, and decrements the value in the counter 42. When the count reaches zero (0), a transfer end signal 421 is sent to the synchronization circuit 43. Upon receiving the transfer end signal 421, the synchronization circuit 43 resets the data transfer flag 432 and also resets the transfer instruction signal 431 in such a manner as to stop the delivery of the buffer memory output control signal 511 in the output signal generation circuit 51.

The buffer memory output control signal 511 is applied to the read control terminal R of the buffer memory 2 through the OR element OR2. Since the input control signal 321 is connected to the input signal 311 of the data transfer control circuit on the downstream side, it is applied to the write control terminal W of the downstream buffer memory through the OR element OR1. Therefore, the data read out from the buffer memory 2 by the operation described above is sequentially written into the downstream buffer memories, and the data is transferred to the adjacent operation units.

Figure 6:
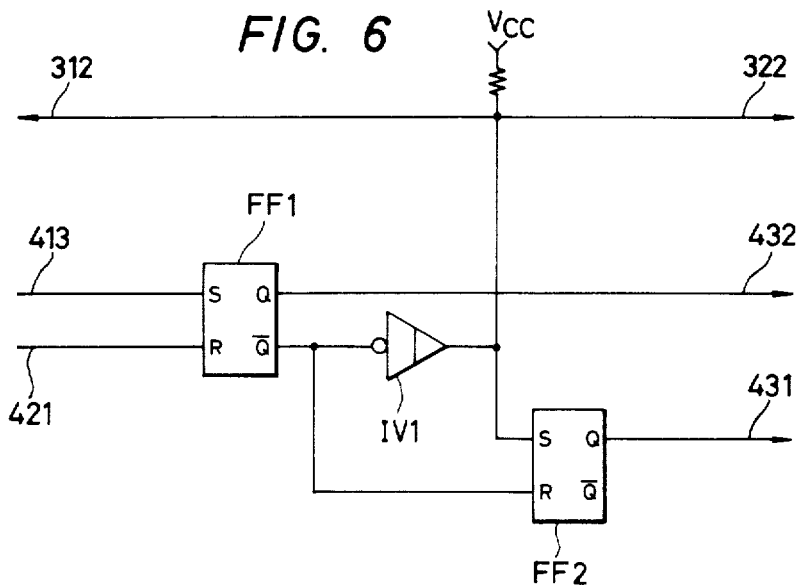
FIG. 6 is a structural view of the synchronization circuit 43 of FIG. 5.

FIG. 6 is a schematic of the circuit construction of the synchronization circuit 43. Symbols FF1 and FF2 in FIG. 6 represent SR flip-flops. When a logic "1" is applied to an S terminal, a Q output assumes a logic "1", and when a logic "1" is applied to an R terminal, the Q output assumes a logic "0". A $\bar{Q}$ output is an inverted logic of the Q output. Therefore, the Q output of FF1, that is, the data transfer flag 432, is set to "1" by the counter set signal 413 and is reset to "0" by the transfer end signal 421.

Symbol IV1 represents a NOT element of an open collector output, and this output signal is connected to the IV1 outputs of the next NOT elements on both sides by the signal lines 312 and 322. Therefore, the outputs of IV1 of the NOT elements of all the operation units are connected mutually in series. For this reason, this output signal assumes a logic "1" when the input of IV1 of all the operation units is "0", that is, when the Q output of FF1 (the data transfer flag 432) is "1", and indicates that the data transfer flag is set in all the operation units. When FF2 is set with this signal and is reset by the $\bar{Q}$ output of FF1, the transfer instruction signal 431 as the Q output of FF2 becomes a signal which assumes a logic "1" during the period when the data transfer flag of all the operation units is set till when the value of the counter 42 of the operation unit of its own becomes zero (0).

Figure 7:
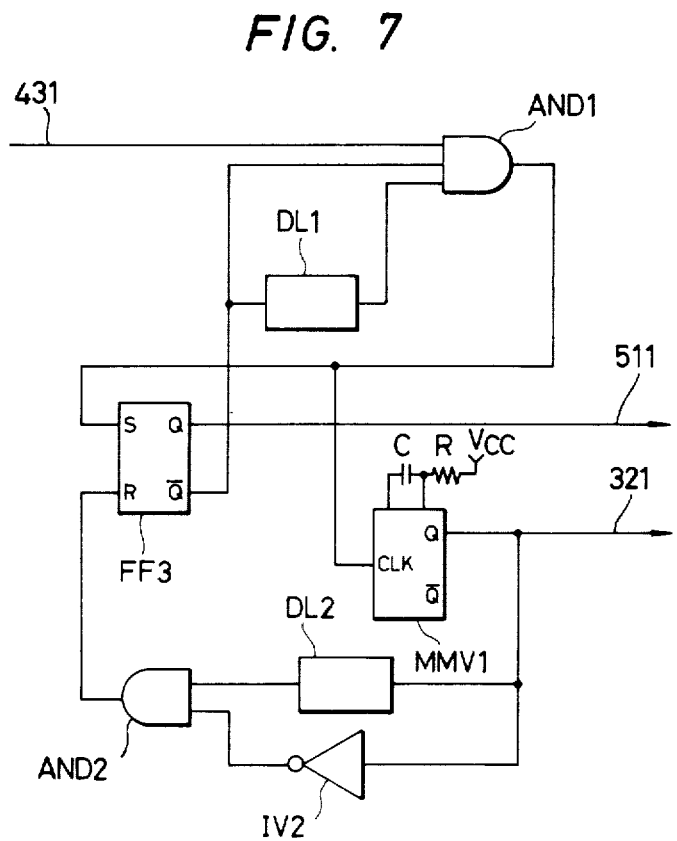
FIG. 7 is a structural view of the output signal generation circuit 51 of FIG. 5.
Figures 8, 9:
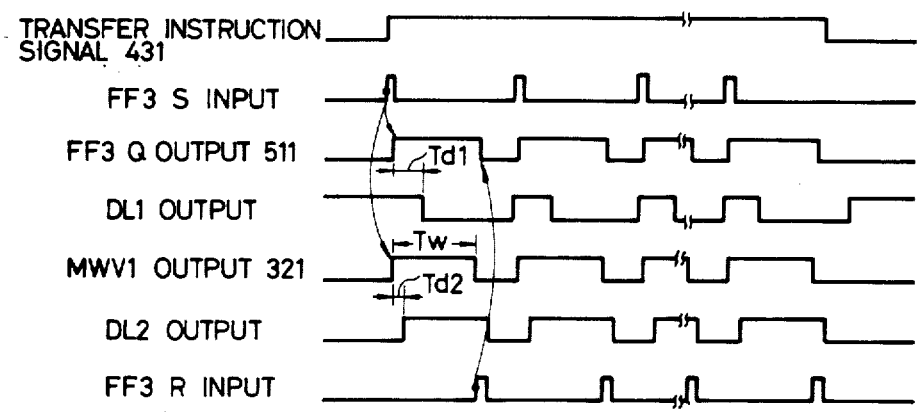

FIG. 7 shows an example of the definite construction of the output signal generation circuit 51. This circuit periodically generates the buffer memory output control signal 511 and the input control signal 321 so long as the transfer instruction signal 431 is "1", and FIG. 8 shows its timing chart. In FIG. 7, symbols DL1 and DL2 represent delay elements, which produce output signals after delaying an input signal by a predetermined time. Symbol MMV1 represents a monostable multivibrator, which produces a pulse having a predetermined time width from the application of a CLK input, and the output pulse width is determined by a resistor R and a capacitor C.

Since the Q output initial value of FF3 is "0", the output of AND1 of an AND element becomes "1" when the transfer instruction signal 431 becomes "1". Since this signal is applied to the S input of FF3, the Q output of FF3 becomes "1", so that the output of AND1 returns to "0" (FF3S input in FIG. 8). Since the output of AND1 is also the CLK input to MMV1, a pulse having a predetermined time width Tw is produced at the Q output of MMV1 output in FIG. 8). The delay element DL2 generates the FF3 reset signal, and produces a pulse of a time width Td2 at the fall of the Q output pulse of MMV1 by means of DL2, IV2, AND2 and applies it to the FF3R input. The delay element DL1 sets the "0" time of the FF3 Q output. After the FF3 Q output returns to "0", the initial state of the circuit is assumed again after the passage of the delay time Td1 of DL1, and the output of AND1 becomes again "1", thereafter repeating the operation described above.

The pulse width Tw of MMV1 and the delay time Td1 of the delay element DL1 are determined in accordance with the characteristics of the buffer memory element such as access time and cycle time.

Hereinafter, examples of data transfer will be described with reference to FIGS. 9 and 10. The buffer memory in each operation unit is of the First-In First-Out type capable of storing therein n data words. The data row inside the buffer memory is determined by the sequence of storage, and the output is effected from the first data of the data row inside the buffer memory.

FIG. 9 shows the change of the content of the buffer memory and the change of the count value of the counter of the data transfer control circuit when there are four operation units and all the processors transfer one data word to the processors that are spaced apart therefrom by two processors.

(1) Each processor stores a respective one of one of the data words A, B, C and D in its buffer memory, and the value of the counter in each data transfer control circuit is set to 2.

(2) One data word is transferred between the buffer memories, and the value of the counter of the data transfer control circuit becomes 1.

(3) The one data word is further transferred between the buffer memories, the value of the counter of the data transfer control circuit becomes 0, and the data transfer between the buffer memories is completed. The data has been transferred to the second buffer memory in the downstream direction, and the processors read the data.

FIG. 10 shows the change of the content of the buffer memory and the change of the count value of the data transfer control circuit when the operation units are four and all the processors transfer one data word to one operation unit $P_4$.

(1) All the processors other than $P_4$ store a respective one of the data words A, B, C in their buffer memories, and the values of the counters in the data transfer control circuits are set to, respectively, 1, 2, 3 and 0.

(2) One data word is transferred between the buffer memories of the operation units $P_1$ and $P_2$, $P_2$ and $P_3$, and $P_3$ and $P_4$, and the values of the counters of the data transfer control circuits become 0, 1, 2, 0.

(3) One data word is further transferred between the buffer memories of the operation units $P_2$ and $P_3$, $P_3$ and $P_4$, and the values of the counters of the data transfer control circuits become 0, 0, 1, 0, respectively.

(4) Furthermore, one word data is transferred between the buffer memories of the operation units $P_3$ and $P_4$, and all the count values of the data transfer control circuits become 0. Then, the processor of the operation unit $P_4$ reads the data from the buffer memory and the data transfer is completed.

As described above, each processor selects various kinds of transfer modes in accordance with the data number to be stored in the buffer memory and with the count value to be set to the counter of the data transfer control circuit.

The buffer memories are connected in a loop to constitute the data transfer bus as in the embodiment described above. Therefore, when the number of processors is N in FIG. 1, the data transfer from the operation unit $P_i$ to $P_{i-1}$ is effected through the buffer memories of $(N-2)$ operation units. In other words, the data transfer from the operation unit $P_i$ to the operation unit $P_{i-1}$ is effected when each processor stores one data word in the buffer memory and sets the count value of the data transfer control circuit to $(N-1)$.

Hereinafter, an example of parallel calculation will be described. A two-dimensional Poison's equation below is differentiated with respect to time and position:

$$\frac{\partial \phi}{\partial t} = \frac{\partial^2 \phi}{\partial x^2} + \frac{\partial^2 \phi}{\partial y^2}$$

where
t: time,
x: position in row direction,
y: position in column direction,
$\phi$: variable to be determined,
to obtain $$\phi_{ij}^{(n+1)} = \lambda\phi_{i-1,j}^{(n)} + (1 - 2\lambda)\phi_{ij}^{(n)} + \lambda\phi_{i+1}^{(n)} + \lambda\phi_{ij-1}^{(n)} + (1 - 2\lambda)\phi_{ij}^{(n)} + \lambda\phi_{ij+1}^{(n)}$$

The following boundary conditions are given in order to calculate $\phi$ at each lattice point:

$$\phi_{0j}^{(n)} = C_{0j}^{(n)}; \phi_{N+1,j}^{(n)} = C_{N+1,j}^{(n)}$$
$$\phi_{i0}^{(n)} = C_{i0}^{(n)}; \phi_{iM+1}^{(n)} = C_{iM+1}^{(n)}$$

where
$\lambda = \Delta t/\Delta x^2 = \Delta t/\Delta y^2$; $\Delta t$ is a time interval for differentiation; $\Delta x_i \Delta y$ is a lattice gap for differentiation; i and j of $\phi_{ij}^{(n)}$ are suffixes representing the arrangement of the two-dimensional lattice; and (n) is a suffix representing the time (n). As the lattice point to be calculated, the lattice point of 4-row and 8-column is selected, and $N=4$ and $M=8$. Calculation is conducted using a parallel processing computer constituted by arranging two-dimensionally the processors shown in FIG. 2. The parallel processing computer has a construction in which the operation units are arranged in 4-rows and 8-columns, and each operation unit makes calculation at the lattice point having the same suffix.

Figure 11:
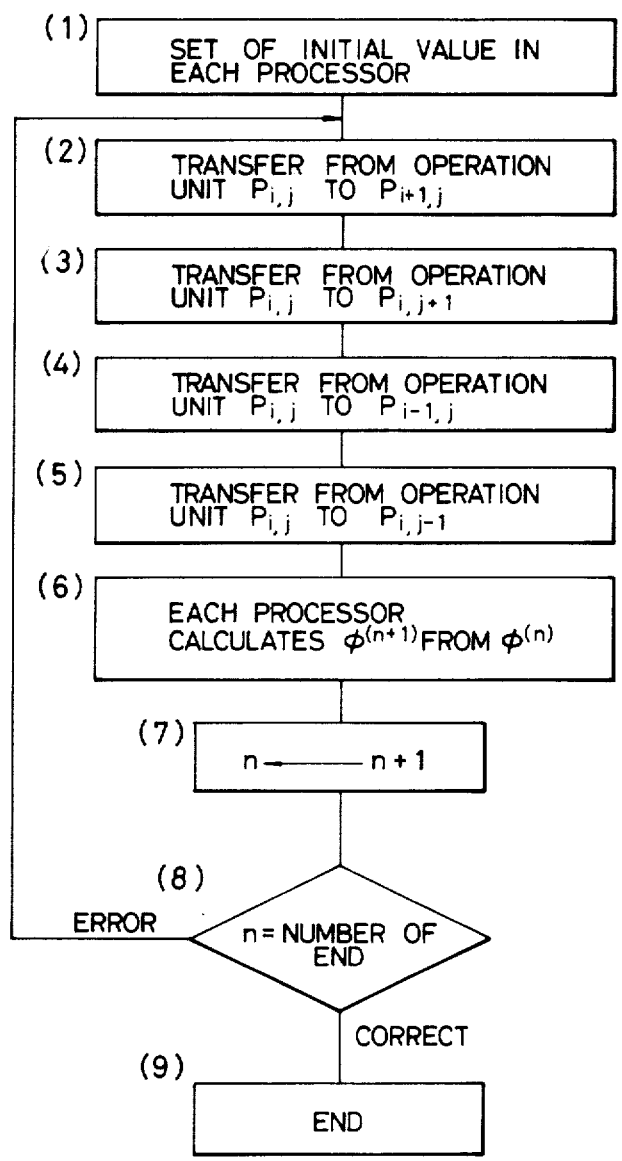
FIG. 11 is a flowchart showing an example of parallel calculation.

The flow of parallel processing will be explained with reference to FIG. 11, which is a flowchart of a parallel calculation.

(1) The initial value $\phi_{ij}(o)$ of each processor is set.

(2) Each processor stores $\phi_{ij}^{(n)}$ in the buffer memory for transfer in the row direction, the value of the counter is set to 1 and the data is transferred.

(3) Each processor stores $\phi_{ij}^{(n)}$ in the buffer memory for transfer in the column direction, the value of the counter is set to 1 and the data is transferred.

(4) Each processor stores $\phi_{ij}^{(n)}$ in the buffer memory for transfer in the row direction, the value of the counter is set to 7 and the data is transferred.

(5) Each processor stores $\phi_{ij}^{(n)}$ in the buffer memory for transfer in the column direction, the value of the counter is set to 3 and the data is transferred.

(6) Each processor calculates $\phi_{ij}^{(n+1)}$ from $\phi^{(n)}$ in accordance with the differential equation described above. The processor which assumes the calculation of $\phi_{ij}$ at the lattice point adjacent the boundary uses the value of the boundary condition.

(7) The number of loops of each processor is counted.
(8) The calculation is completed.

Hereinafter, the second embodiment of the present invention will be described.

Figure 12:
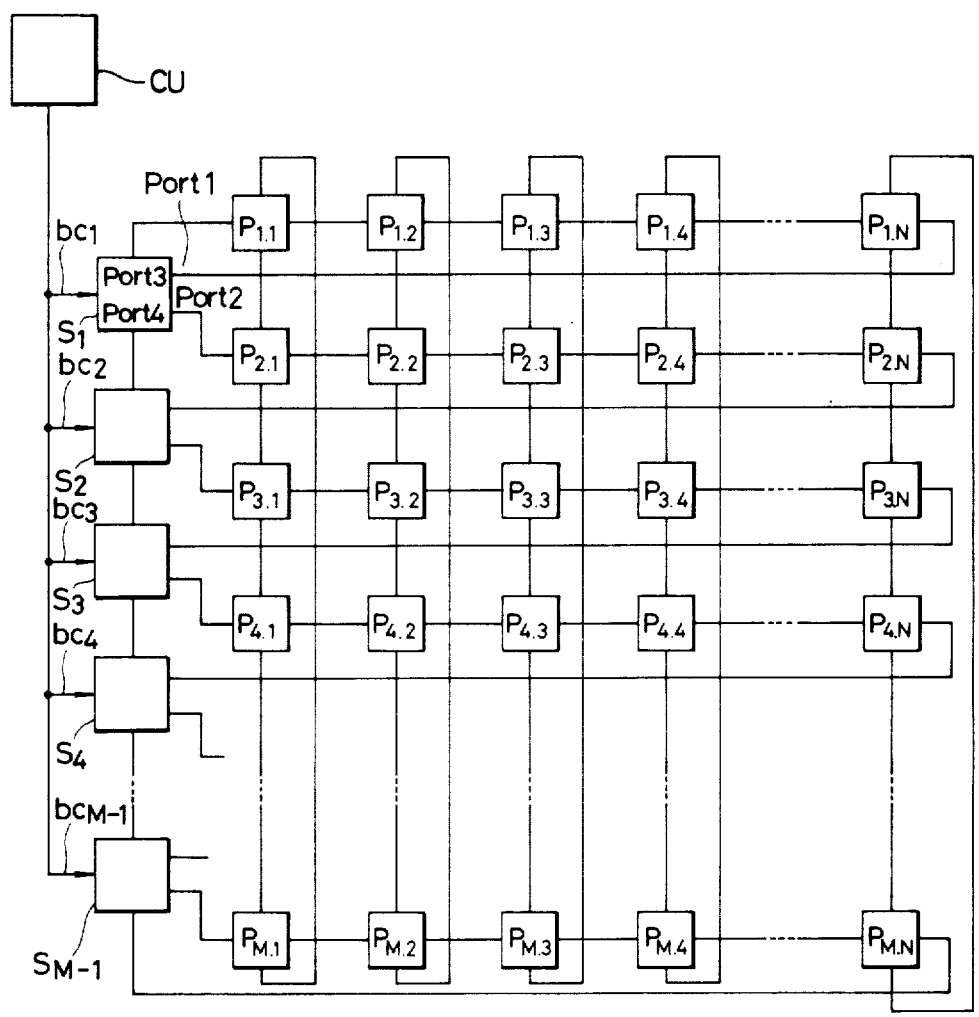
FIG. 12 is a block diagram showing the structure of a parallel processing computer of the present invention.
Figure 13:
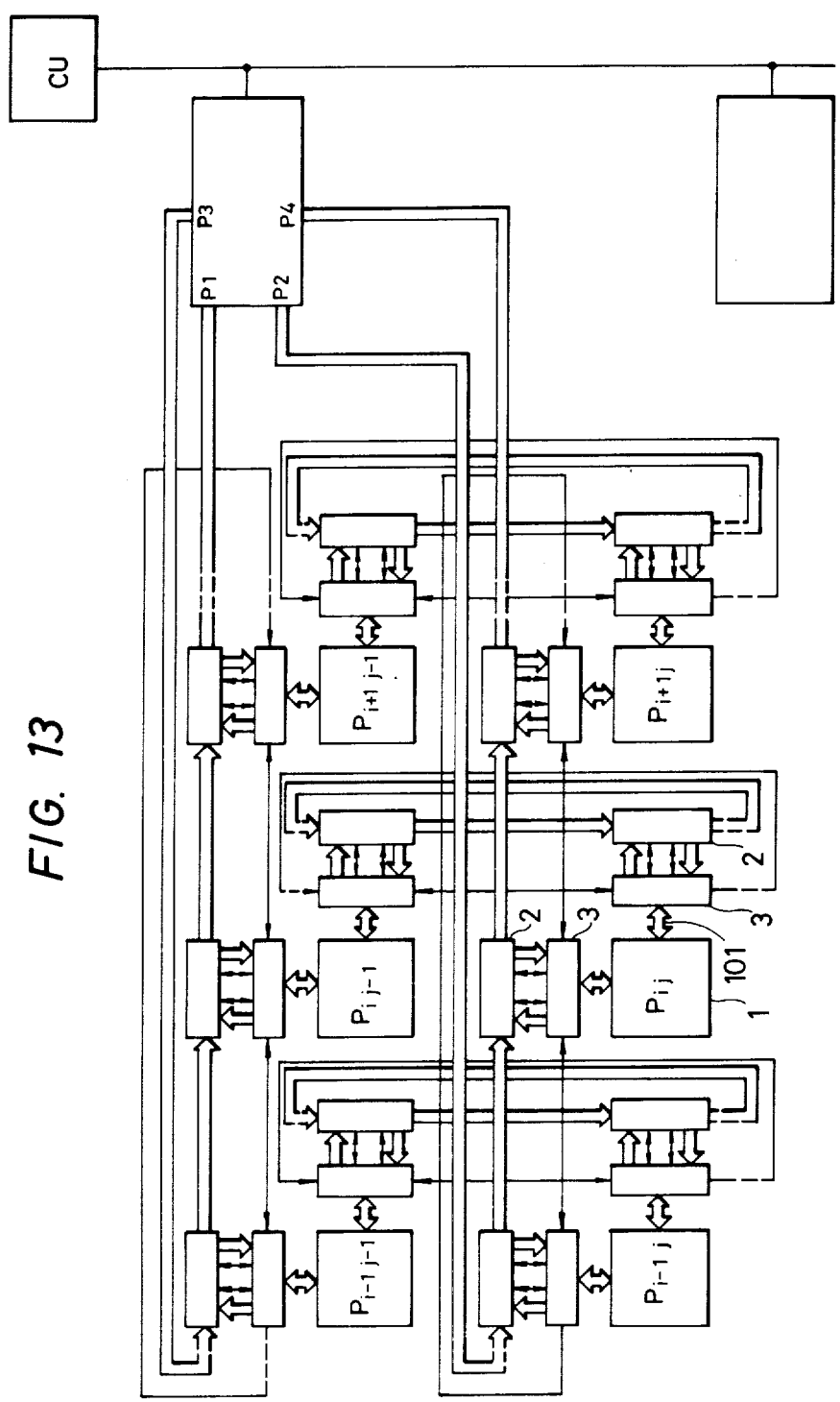
FIG. 13 is a detailed diagram of the computer of FIG. 12.

FIG. 12 is a block diagram showing the construction of a parallel processing computer in accordance with the present invention. FIG. 13 shows in detail the construction of a parallel processing computer of FIG. 12. In FIG. 12, symbols $P_{i,j}$ ($i=1 \sim M$, $j=1 \sim N$) are operation units, $S_i$ ($=1 \sim m-1$) are bus connection mechanisms, a control processor. The operation units $P_{i,j}$ are arranged two-dimensionally, and the adjacent operation units of the rows and columns are connected to one another by row and column direction data transfer buses, respectively. The bus connection mechanisms $S_i$ are interposed between the operation units of the ith row and the operation units of the (i+1)the row, and the final operation unit $P_{i,N}$ of the ith row is connected to the leading operation unit $P_{i+1,1}$ of the (i+1)th row. The adjacent bus connection mechanisms ($S_i$ and $S_{i-1}$ and $S_{i+1}$) are connected to one another by the data transfer buses.

Figure 14:
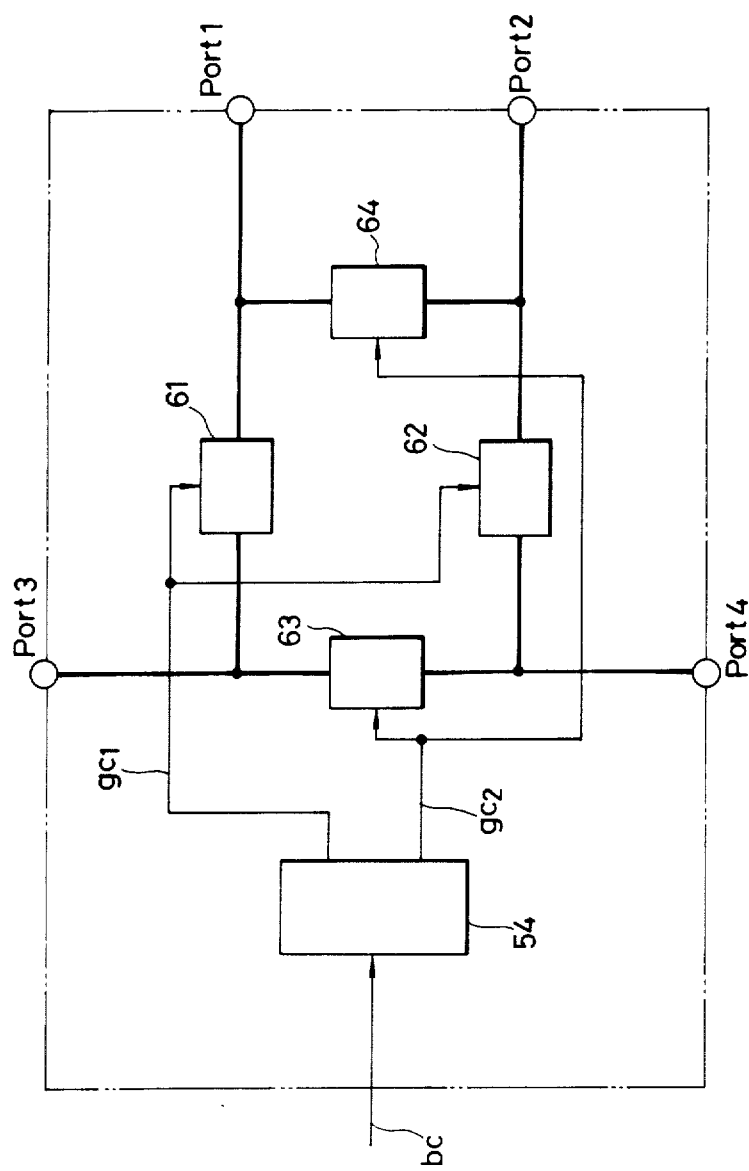
FIG. 14 is a block diagram showing the structure of a bus connection mechanism in FIG. 12.

The bus connection mechanism $S_i$ connects and cuts off the connection between the four bus input-output ports port 1-port 4. FIG. 14 is its block digram. In the drawing, reference numeral 54 represents a gate control circuit, and numerals 61~64 are gate circuits. These gate circuit 61~64 electrically connect the input and output lines when the gate control signals gc1, gc2 are ON, and electrically isolate them from one another when the gate control signals gc1, gc2 are OFF. The gate control circuit 11 turns ON either of the gate control signals gc1, gc2 by means of a bus connection control signal from the control processor CU.

When the gate control signal gc1 is ON, the gate circuits 61 and 62 are conductive, so that the port 1 is connected to the port 3, and the port 2 to the port 4. Similarly, when the gate control signal gc2 is ON, the gate circuits 63 and 64 are conductive, so that the port 1 is connected to the port 2, and the port 3 to the port 4.

Here, the final operation unit of the ith row is connected to the port 1 of the bus connection mechanism $S_i$ in FIG. 12, and the data transfer bus of the leading operation unit of the (i+1)th row is connected to the port 2. The ports 3 and 4 are connected to the ports 4 and 3 of the adjacent bus connection mechanisms $S_{i-1}$ and $S_{i+1}$, respectively. Therefore, when the gate control signal gc1 is ON, the operation units of the ith row and the (i+1)th row are cut off from one another, and when gc2 is ON, the operation units of the (i+1)th row are connected to the back of the final operation unit of the ith row, so that the ith row becomes the same as the (i+1)th row.

Therefore, if the gate control signal gc1 is ON in all the bus connection mechanisms $S_1 \sim S_{N1-1}$, no connection is established between the rows so that the operation unit become those of the M-row N-column two-dimensional arrangement. If the gate control signal gc2 is ON, on the other hand, all the rows are connected to one another so that M×N sets of unidimensional arrangement processors are formed. Furthermore, if connection and disconnection are effected for the individual bus connection mechanisms, various operation unit arrangements can be obtained.

Figure 15:
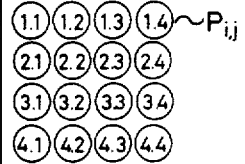
FIG. 15 shows an example of the processor arrangement.
Figure 15:
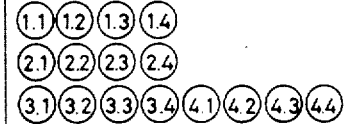
Figure 15:
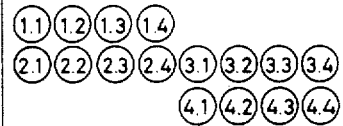
Figure 15:
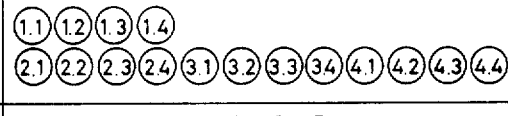
Figure 15:
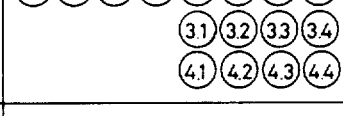
Figure 15:
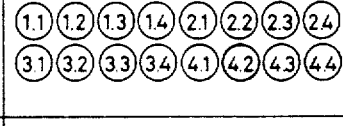
Figure 15:
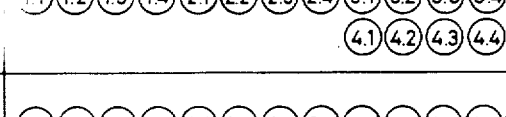
Figure 15:

FIG. 15 shows examples of the operation unit arrangements. In this case, a 4-row 4-column two-dimensional arrangement consisting of 16 sets of operation units is used as the basic structure and three bus connection mechanisms $S_1$–$S_3$ are disposed between the rows. When a bus connection control signal $bc_1$ to be applied to the bus connection mechanism $S_i$ is a logic "0", the rows are cut off from one another, and when it is a logic "1", the rows are connected to one another. In this case, a square operation unit arrangement, a rectangular operation unit arrangement and an odd-shaped operation unit arrangement having a complicated shape with projections and recesses can be formed depending upon the combinations of the bus control signal $bc_1$ to be applied to each bus connection mechanism $S_i$.

However, the connection of the data transfer buses in the column direction is always the same as that of the basic structure, and is $P_{1,j} \rightarrow P_{2,j} \rightarrow ... \rightarrow P_{M,j}$. Therefore, the data transfer distance in the column direction will be elongated if the operation unit arrangement is changed. In the case of a 2-row 8-column structure shown in FIG. 15(f), for example, the operation unit of the next row and the same column of $P_{1,1}$ is $P_{3,1}$, but the actual data transfer is effected through the route $P_{1,1} \rightarrow P_{2,1} \rightarrow P_{3,1}$. If the system can easily execute the data transfer between remote operation units at high speed, however, this does not create any problem from the aspects of program processing and the time, and can be handled substantially in the same way as data transfer between adjacent operation units.

Figure 16:
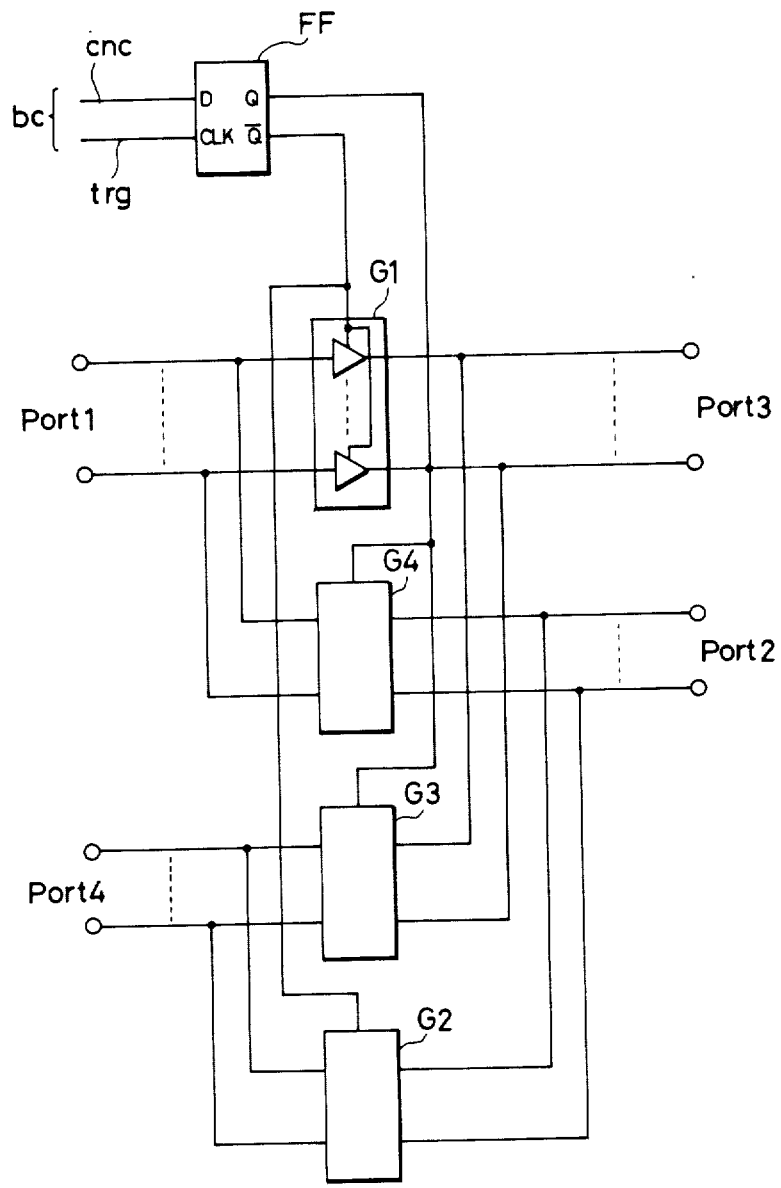
FIG. 16 shows an example of a logic circuit of the bus connection mechanism.

FIG. 16 shows schematically the bus connection mechanism of FIG. 14 by means of a logic circuit. In FIG. 16, it will be assumed that the bus connection control signal bc consists of a connection signal cnc which designates connection and disconnection between the rows by logics "1" (connection) and "0" (disconnection), and a trigger signal trg for executing the connection and disconnection operations. FF represents a D-type flip-flop, and $G_1$ through $G_4$ are logic elements generally referred to as "three state buffers". The gate control circuit 54 and the gate circuits 61–64 of FIG. 14 can be realized extremely easily by one D-type flip-flop and one set each of three state buffer G1–G4, respectively.

As described above, in the parallel processing computer in accordance with the second embodiment, the operation unit arrangement is variable, and the operation unit arrangement having the highest efficiency can be formed in accordance with the shape of the lattice point arrangement of the problem to be processed.

In the second embodiment described above, the bus connection mechanism is disposed for each row, but the same function can be obviously obtained by disposing the bus connection mechanism for each column. Furthermore, the bus connection mechanisms can be disposed for both rows and columns so that they are suitably and selectively used in accordance with a problem to be processed.

The control processor CU has the function of providing the bus connection control signal $bc_1$ to each bus connection mechanism $S_i$. The simplest form has a switch disposed in such a manner as to correspond to each bus connection control signal $bc_1$ in order to manually control each bus connection mechanism $S_i$. Alternatively, it is possible to provide each bus connection mechanism $S_i$ with the bus connection control signal $bc_1$ through a digital signal output circuit by using a processor and the digital signal output circuit, determining an optimal operation unit arrangement from the calculation lattice point arrangement by the processor and applying the bus connection control signal on the basis of this result.

Figure 17:
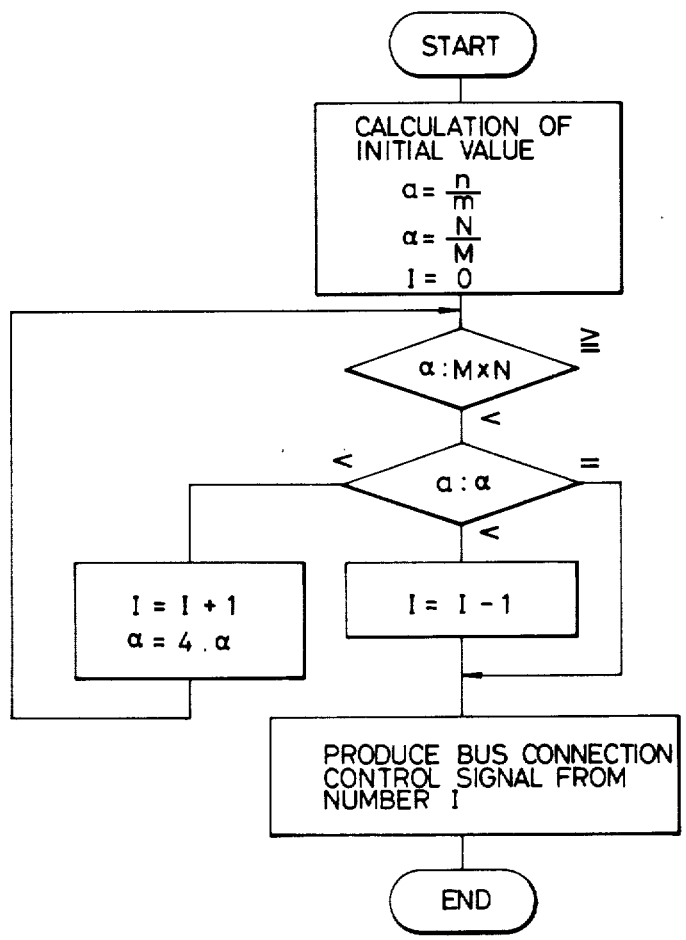
FIG. 17 is a flow chart showing the calculation sequence of the processor arrangement.

FIG. 17 shows an example of a calculation method which determines the optimal operation unit arrangement from the calculation lattice point arrangement. It will be assumed that m and n are numbers of rows and columns, respectively, M and N are numbers of rows and columns of the operation units and the number of lattice points is greater than that of the operation units. The definite sequence is as follows.

(1) A row-to-column ratio a of the calculation lattice points and a row-to-column ratio α of the operation units are determined as initial values, and the number of change of arrangement I=0.

(2) The row-to-column ratio a of the calculation lattice points is compared with the row-to-column ratio α of the operation units. If a>α, the number I of the change of arrangement is updated to change the operation unit arrangement, and the row-to-column ratio α of the operation units is changed.

(3) The procedure (2) is repeated until the relation a=α or a<α is satisfied, and if α exceeds the number of operation units during this procedure, the procedure is terminated.

(4) The bus connection control signal is produced from the number I of the change of arrangement obtained in the manner described above. An M-1 bit binary data BC is assumed, the bits from the lower order bits are assumed to be sequentially the bus connection control signals for the bus connection mechanisms $S_1$, $S_2$, ..., $S_{M-1}$, and the connection to the adjacent rows is assumed to be made when the logic is "1".

The binary data BC is prepared by putting $K=2^I$ and i K bits (i=1, 2, ...) from the lowest order are set to "0" with the other being set to "1".

Next, some calculation examples by the parallel processing computer of the second embodiment of the present invention will be illustrated.

(1) Two-dimensional problem

A difference solution methods of a two-dimensional Poisson's equation $$\frac{\partial \phi}{\partial t} = \frac{\partial^2 \phi}{\partial x^2} + \frac{\partial^2 \phi}{\partial y^2}$$

(t: time, x and y: positions in the row and column directions, $\phi$: variable to be obtained) will be considered. In other words, $\phi_{i,j}$ at each lattice point i, j is calculated for $$\phi_{i,j}^{(k+1)} = \lambda\phi_{i-1,j}^{(k)} + (1 - 2\lambda)\phi_{i,j}^{(k)} + \lambda\phi_{i+1,j}^{(k)} +$$

$$\lambda\phi_{i,j-1}^{(k)} + (1 - 2\lambda)\phi_{i,j}^{(k)} + \lambda\phi_{i,j+1}^{(k)}$$

($\lambda = \Delta t/\Delta x^2 = \Delta t/\Delta y^2$, $\Delta t$: time interval, $\Delta x$ and $\Delta y$: lattice point gap, i, j: suffixes representing the arrangement of two-dimensional lattice arrangement, K: time step) by giving the following boundary conditions:

$$\phi_{0,j}^{(k)} = C_{0,j}^{(k)} = \phi_{m+1,j}^{(k)} = C_{m+1,j}^{(k)}$$

$$\phi_{i,0}^{(k)} = C_{i,0}^{(k)}, \phi_{i,n+1}^{(k)} = C_{i,n+1}^{(k)}$$

Here, it will be assumed that the number of the operation units is 256 and the basic structure M-rows N-columns is 16-rows and 16-columns. It will be also assumed that the calculation lattice points are 16-row 256-column. The definite calculation sequence will be illustrated below.

(i) The operation unit arrangement is changed in the sequence described already by the control processor CU before the calculation of $\phi_{i,j}$. The row-to-column ratio of the calculation lattice points is 256:16=16, whereas that of the operation units is 1. In accordance with the calculation method described above, therefore, the number of the change of arrangement becomes 2, and the operation unit arrangement is changed to 4-row 64-column.

(ii) In each operation unit, the 16 data in all at the edges of the calculation lattice point arrangement of the 4-row 4-column are transferred to the adjacent operation units. That is, assuming that i' and j' are suffixes of the lattice point, $$\phi_{i',1}^{(k)} (i' = 1\sim4)$$

is transferred to the left operation unit, $$\phi_{i',4}^{(k)} (i' = 1\sim4)$$

is transferred to the right operation unit, $$\phi_{1,j'}^{(k)} (j' = 1\sim4)$$

is transferred to the upper operation unit and $\phi_{4,j'}(j=1\sim4)$ is transferred to the lower operation unit.

(iii) Each operation unit calculates $$\phi_{i',j'}^{(k+1)}$$

using the data of its own, i.e., $$\phi_{i',j'}^{(k)} (i',j' = 1\sim4)$$

and the data from the upper, lower, left and right operation units adjacent thereto. (iv) The procedures (ii) and (iii) are repeated by updating k.

If this problem is solved without changing the operation unit arrangement, each operation unit calculates one-row 16-column lattice points. Therefore, the number of data transferred between the operation units in this case is $1\times2+16\times2=34$, and this is more than double the present invention.

(2) Unidimensional problem

A unidimensional problem $$\frac{\partial \phi}{\partial t} = \frac{\partial^2 \phi}{\partial x^2}$$

of the same equation as described above will be considered. It will be assumed that the number of operation units is 256 in a 16-row 16-column arrangement and the number of the calculation lattice points is 256 in the same way as the number of the operation units.

The calculation sequence is exactly the same as that of the two-dimensional problem, and is as follows. (i) The operation unit arrangement is changed to 1-row 256-column. Each operation unit is in charge of one lattice point. (ii) Each operation unit transfers data $\phi^{(k)}$ to the right and left operation units. (iii) Each operation unit calculates $\phi^{(k+1)}$ using the data of its own and the data from the right and left operation units. (iv) The procedures (ii) and (iii) are repeated by updating k.

Although a plurality of bus connection mechanisms are disposed in the embodiment described above, the processors of arbitrary rows or columns can be connected unidimensionally by one bus connection mechanism by increasing the number of the switching circuits in the bus connection mechanism.

We claim:

1. A parallel processing computer comprising a plurality of operation units, each of said operation units including a processor, a buffer memory, and data transfer control means for controlling data transfer between the processor and the buffer memory and data transfer between the buffer memory and buffer memories in other of said operation units in response to said processor of the operation unit; and data buses connecting said buffer memories to one another to effect data transfer therebetween, wherein said processors operate during a transfer operation to simultaneously store data in the respective buffer memories and to control the respective data transfer control means to transfer data simultaneously among the buffer memories of said operation units, and wherein said data transfer control means in each operation unit includes means for storing a value equal to a number of successive data transfers to be effected from the buffer memory of that operation unit during said transfer operation.

2. A parallel processing computer comprising a plurality of operation units, each of said operation units including a processor, a buffer memory, and data transfer control means for controlling data transfer between the processor and the buffer memory and data transfer between the buffer memory and buffer memories in other of said operation units in response to said processor of the operation unit; and data buses connecting said buffer memories to one another to effect data transfer therebetween.

3. The parallel processing computer according to claim 1, wherein a plurality of said operation units are arranged two-dimensionally by connecting said operation units to one another in a matrix of rows and columns, and further comprising at least one bus connection mechanism which connects in series the operation units of an arbitrary number of rows or columns with one another.

4. The parallel processing computer according to claim 3 wherein a plurality of said bus connection mechanisms are disposed in such a manner as to provide one for each row or each column, and each of said bus connection mechanisms consists of four switching circuits having input and output terminals connected to the buses of said operation units or to the other of said bus connection mechanisms and a control circuit controlling the operation of each of said switching circuits.

5. The parallel processing computer according to claim 4 wherein said control circuit in said bus connection mechanism is subjected simultaneously to open and closing control by a bus connection signal from one control processor.

6. A parallel processing computer comprising a plurality of operation units, each of said operation units including a processor, a buffer memory, and data transfer control means for controlling data transfer between the processor and the buffer memory and data transfer between the buffer memory and buffer memories in other of said operation units in response to said processor of the operation unit; and data buses connecting said buffer memories to one another to effect data transfer therebetween, wherein said data transfer control means in each operation unit includes decoder means responsive to a command and a read/write signal from the associated processor for controlling the associated buffer memory to effect reading or writing of data according to the state of said read/write signal.

7. A parallel processing computer according to claim 6, wherein each data transfer control means further includes synchronization means connected to all of said operation units and to said decoder means for producing an output when all of said operation units are in a data transfer condition, and signal generator means responsive to said output of said synchronization means for transmitting an input control signal to another operation unit to control the writing of data in the buffer memory thereof and for applying periodic signals to said buffer means in its associated operation unit to enable the reading of data from said buffer memory to said another operation unit on the connecting data bus.

8. A parallel processing computer according to claim 7, wherein each data transfer means further includes a presentable counter which is preset to a count received from the associated processor under control of said decoder means and is decremented in response to said periodic signals from said signal generator means, said presettable counter being connected to said synchronization means to inhibit the output thereof when said count has been decremented to zero.

9. A parallel processing computer comprising a plurality of operation units, each of said operation units including a processor, first and second buffer memories, and two data transfer control circuits for controlling data transfer between the processor and a respective buffer memory and for controlling data transfer between the respective buffer memory and the buffer memories of other operation units; and data buses connecting said buffer memories of said operation units to one another in order to arrange said operation units in a matrix arrangement in which said first buffer memories of said operation units are connected in rows and said second buffer memories of said operation units are connected in columns to enable data transfer therebetween.

10. A parallel processing computer comprising a plurality of operation units, each of said operation units including a processor, two buffer memories, and two data transfer control circuits for controlling data transfer between the processor and the buffer memory and for controlling data transfer between the buffer memory and the buffer memories of other operation units; and data buses connecting said buffer memories to one another in order to arranged said operation units in a matrix arrangement of rows and columns to enable data transfer therebetween, further comprising at least one bus connection mechanism disposed in each row of said matrix arrangement of operation units for connecting and disconnecting different rows of said operation units.

11. A parallel processing computer according to claim 10, wherein each of said bus connection mechanisms comprises four switching circuits having input and output terminals connected to the buffer memory of the operation unit disposed in an end of the rows and to other bus connection mechanisms, and a gate control circuit controlling the operation of each of said switching circuits.

12. A parallel processing computer according to claim 11, wherein said gate control circuits in said bus connection mechanism are subjected simultaneously to open and closing control by a bus connection signal from one of the processors.

* * * * *